Figure 4:
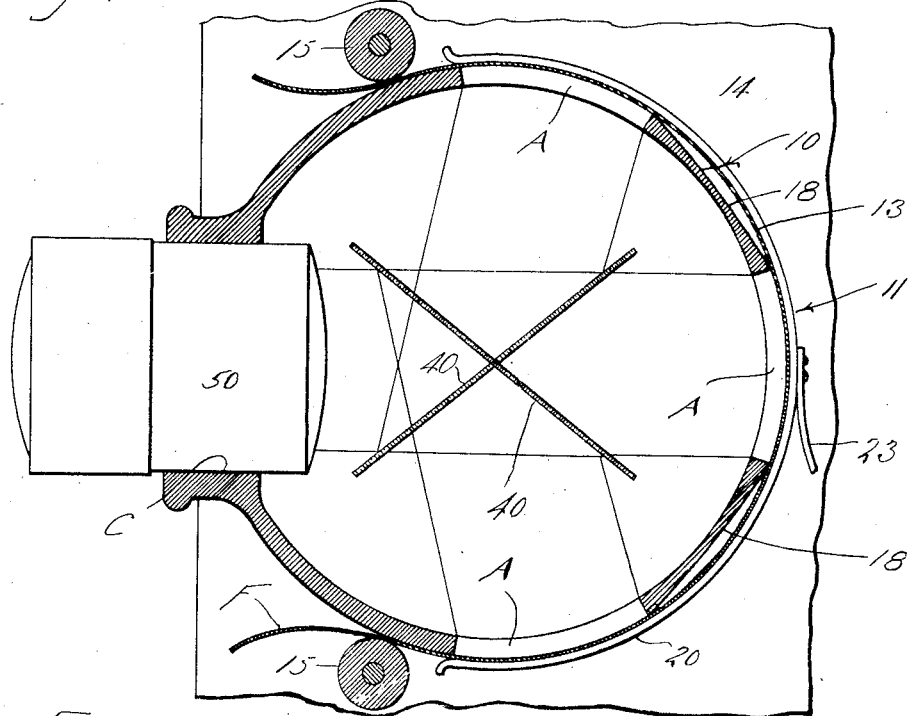

Feb. 14, 1933.  W. L. WRIGHT  1,897,097
FILM HANDLING MECHANISM
Filed June 12, 1928   2 Sheets-Sheet 1
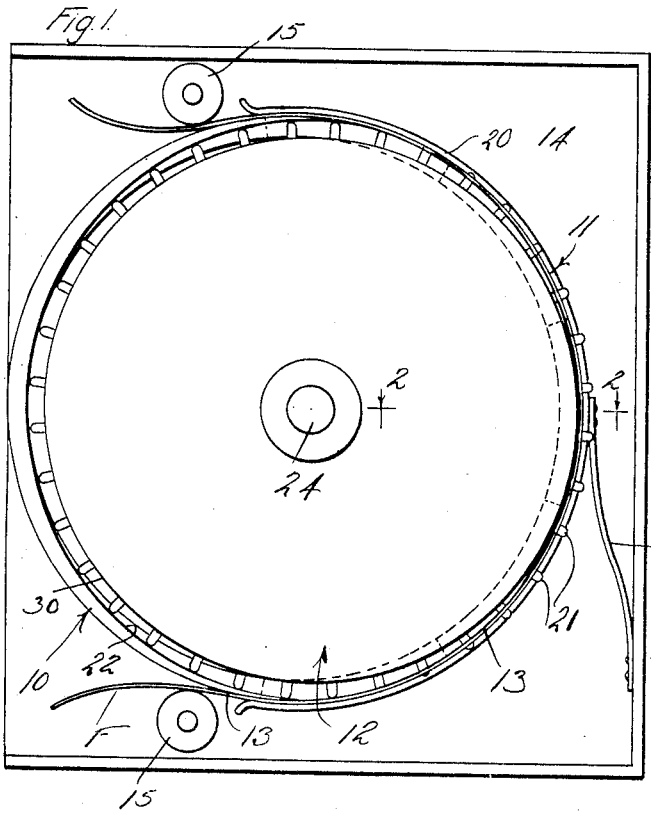
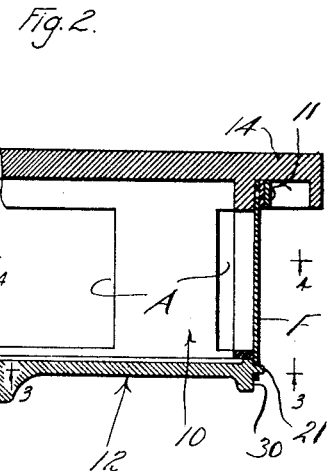
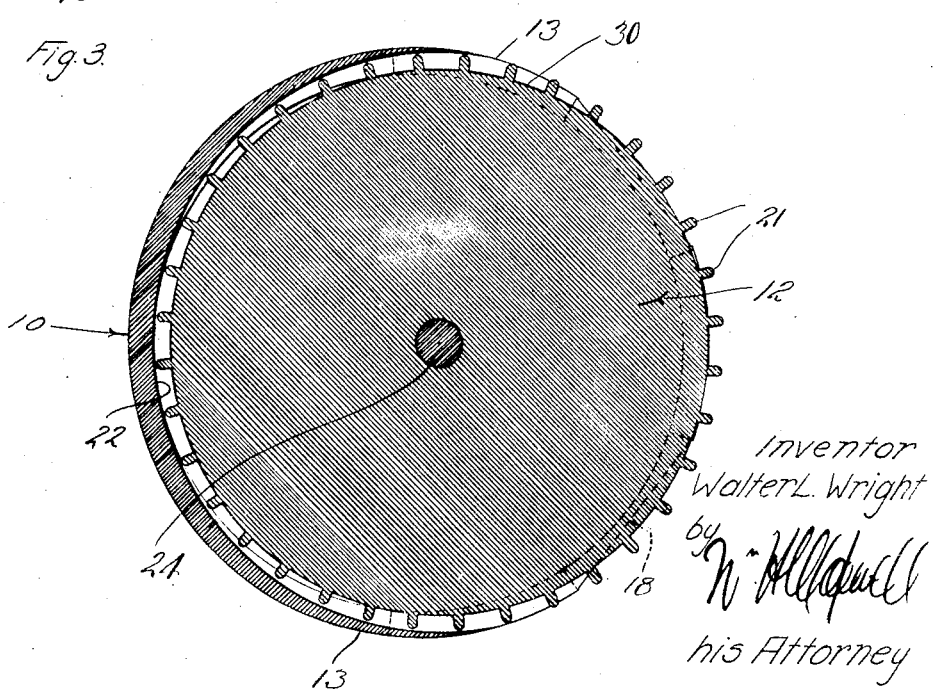
Inventor
Walter L. Wright
by
his Attorney Feb. 14, 1933.   W. L. WRIGHT   1,897,097
FILM HANDLING MECHANISM
Filed June 12, 1928   2 Sheets-Sheet 2

Inventor
Walter L. Wright
by
his Attorney

Patented Feb. 14, 1933

1,897,097

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

FILM HANDLING MECHANISM

Application filed June 12, 1928. Serial No. 284,837.

This invention relates to film handling mechanism and it is an object of the invention to provide a practical and effective mechanism for handling a film in connection with a plurality of spaced points or apertures.

In various phases of photography, and particularly in color photography, it is desirable to simultaneously expose or project a plurality of spaced picture areas of a single film. This is especially true in the art of color motion picture photography, and therefore I will describe the invention with reference to a standard form of motion picture film, it being understood that the broader principles of the invention are not to be considered limited or restricted to any such specific application.

A motion picture film suitable for color motion picture photography and of the general type that can be handled to advantage in the mechanism provided by this invention is set forth in United States patent to Colin N. Bennett Number 1,217,391, issued February 27, 1917. A motion picture film such as I am referring to carries a plurality of series of pictures, each series comprising two or more spaced pictures. The shrinkage and expansion of the film stock due to aging, climatic conditions, etc., give rise to serious difficulties in the course of practical operation. For instance, the several pictures of a series when exposed or first taken are in certain definite spaced relation on the film, but the finished pictures developed for use are not necessarily in such definite spaced relation, the spaces between pictures having changed due to shrinkage or expansion of the film stock.

It is to be understood, of course that the mechanism may be used to handle a film on which the picture of a series are in adjoining relation.

The ordinary film handling mechanism provided for handling this type of film engages the film adjacent the picture at one end of the series, definitely positioning that particular point of the film. Under such conditions the other pictures of the series, and especially the picture at the other end of the series, are often considerably out of line or proper register.

It is a primary object of my present invention to furnish a mechanism for engaging and operating a film so that the film is held and guided throughout a substantial portion of its length and in a manner to practically overcome the conditions above pointed out.

It is another object of this invention to provide a film handling mechanism such as I have referred to which engages the film at the center of the series of pictures so that any error or variations occurring in the spacing of the pictures, due to shrinkage or expansion of the film stock, will be divided between the center of the series and the two ends rather than being allowed to occur between the picture at one end of the series and that at the other end.

Another object of this invention is to furnish a film handling mechanism which operates to hold the film in a slightly curved position during exposure or projection, thus assuring a uniform positioning of the film each time it is used, which condition is practically impossible to obtain when attempting to hold the film in a flat plane.

A further object of the invention is to provide a combination of a curved film guide for holding a film in a slightly curved position and an actuating sprocket engaging the film to operate it.

Another object of the invention is to provide a mechanism supporting a plurality of spaced parts of a film around a common center.

It is another object of the invention to provide a mechanism of the character mentioned wherein the film has a long bearing engagement on the operating sprocket so that very little pressure is required to stop the film with the sprocket.

The invention provides a large number of sprocket teeth in engagement with the film thus distributing the strain and wear along a considerable length of film.

Figure 5:
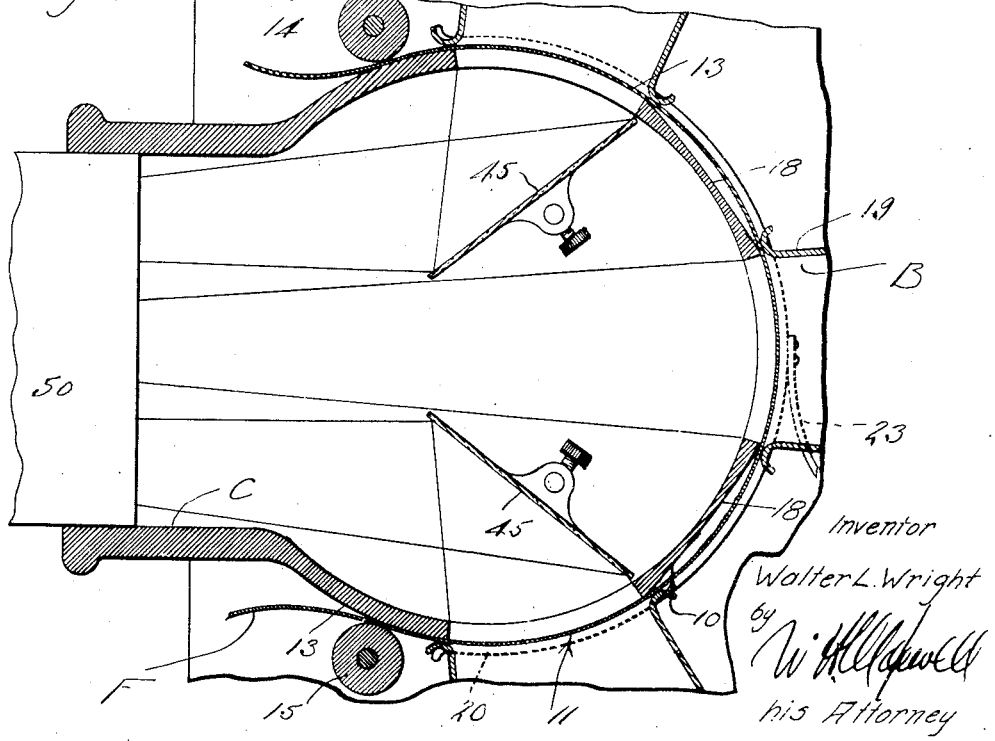

The various objects and features of my invention will be best and more fully understood from the following detailed description of a typical form and applications of the invention, throughout which description I refer to the accompanying drawings, in which:

Fig. 1 is a view illustrating the mechanism from one end. Fig. 2 is a sectional view taken as indicated by line 2—2 on Fig. 1. Fig. 3 is a detailed sectional view of the mechanism taken through the feed sprocket being a view taken on line 3—3 on Fig. 2. Fig. 4 is a detailed sectional view of the mechanism taken through the exposure apertures of the film guide being a view taken on line 4—4 on Fig. 2. Fig. 5 is a view similar to Fig. 4 showing another form of optical system in the mechanism.

The mechanism provided by this invention includes, generally, a curved guide 10 for the film F, suitable film holding means 11 for cooperating with the guide in holding the film F and a rotatable film actuating member 12 arranged in combination with the guide to engage the film at the guide for actuating or advancing it.

The film guide 10 provided by the invention has a convex face 13 over or around which the film F is adapted to operate. In accordance with the preferred form of the invention the guide is a fixed member having its face 13 curved about a central point and sufficiently wide to properly carry the film F. The guide may be a circular metal shell, as shown in the drawings, and may be supported through a flange 14 adjoining one end.

The film F, which may be considered a standard type of motion picture film, has its central portion occupied by picture areas and its margins or edge portions provided with perforations for receiving sprocket teeth. For purpose of example I will consider the film F as carrying a plurality of series of pictures each series comprising three pictures spaced apart distances corresponding to one picture area and adjoining series being meshed together so that the spaces between the pictures of each series are occupied by pictures of other series. The film F extends over or around the face 13 of the guide 10, as clearly shown throughout the drawings and may be guided onto and from the guide 10 by means of suitable guide rollers 15.

The mechanism provided by this invention may be used in connection with various optical systems. In practice it may be used either in the taking or exposure of the film or in the projection of the film. In Fig. 4 of the drawings I disclose an optical system in connnection with the mechanism suitable for the taking of pictures in which case light from the subject is passed into the guide 10 and directed radially outward with reference to the guide onto the film F. In this case the guide 10 is provided with a plurality of spaced picture apertures A. The number and spacing of the apertures A is, of course, dependent upon the optical system or the character of film desired. For purpose of example I have shown three picture apertures A spaced apart distances corresponding to the width of one picture aperture. This particular arrangement of apertures is for the taking of the type of film that I have specifically mentioned above. In Fig. 5 of the drawings I illustrate an optical system in connection with a mechanism suitable for the projection of pictures. In this case light is adapted to be projected radially inward through the film and picture apertures A in the guide 10 to be reflected from within the guide onto a screen, or the like.

In accordance with the preferred form of the invention, the face 13 of the guide is relieved or cut away between adjoining picture apertures A so that the middle or picture-carrying portion of the film F is engaged by the face 13 only at the margin or frame of the picture apertures A. In the drawings I have shown the face 13 having tangential flat parts 18 between the apertures A as clearly shown in Figs. 4 and 5 of the drawings. This reduces the friction between the film and guide and minimizes the danger of scratching the film. In certain cases, for instance in an arrangement such as is shown in Fig. 5, it may be desired to provide aperture plates or gates 19 at the outer side of the film F in register with the picture apertures A in the guide 10. The gates 19 may have suitable apertures B to register with the apertures A in the guide and may be mounted to properly accommodate or pass the film F.

The film-holding means may be any suitable device or combination of devices operable to properly guide and hold the film F on the guide 10 and actuating member or sprocket 12. Because of the construction provided by this invention, the film is properly held in place by very little pressure. In the drawings I have illustrated a simple form of film-holding means 11. In this case a resilient shoe 20 is provided to engage around the film, the face of the shoe being made to conform to the curvature of the outer side of the film F and being sufficiently long to extend around the film at the several apertures A. The shoe may be in the form of a spring and may be supported in position by means of a spring arm 23. In this case the arm 23 urges the shoe toward the guide 10 so that the film is held between the shoe and the guide. The arm allows for general or bodily movement of the shoe 20 while the resiliency of the shoe permits of its various parts properly accommodating themselves to the film F to be held on the guide 10. In the preferred construction the shoe 20 is narrow and engages only one of the margin or edge portions of the film F and does not extend across the middle or picture-carrying portion of the film.

The film actuating member 12 is preferably in the form of a sprocket mounted eccentric to the axis of the guide face 13 so that its face 30 formed at the base of the teeth 21, coincides with the face 13 of the guide at the center or middle picture aperture A. The guide 10 is provided with a recess 22 at one side allowing the sprocket to operate at one margin of the film so that its teeth engage the perforations of the film. It is to be understood, of course that the sprocket might be made to engage both margins of the film F. In accordance with the invention, the sprocket is made comparatively large in diameter, in fact almost as large in diameter as the guide, so that its face 30 has almost the same curvature as the face 13 of the guide. By thus proportioning the guide and sprocket the teeth 21 of the sprocket operate to project into the perforations of the film for a considerable distance to either side of the central point at which the faces 13 and 30 coincide.

In practice I have proportioned the parts so that the teeth 21 of the sprocket start to project into the perforations in the film at a point close to one of the end apertures and continue in the perforations to a point close to the other end aperture. It is to be understood that the sprocket may be mounted on a suitable operating shaft 24 and that it may be intermittently moved in the desired manner by any suitable intermittent movement mechanism. The long or extended bearing engagement between the film and sprocket causes the sprocket to have a firm grip on the film so that the film stops with the sprocket, with very little additional friction or pressure. A light shoe 20 is all that is needed to stop the film.

It will be apparent from the foregoing description that various optical systems or arrangements may be provided in connection with the mechanism just described. For purpose of example I have illustrated two different optical systems. One of these systems is shown in Fig. 4 and provides crossed reflectors 40 located within the guide 10 to receive light entering the guide through an aperture C and direct it onto the film F through the three exposure apertures A. This particular light-dividing means or optical system is set forth and claimed in my co-pending application entitled Optical system, filed Nov. 15, 1927, Serial Number 233,375.

In Fig. 5 I illustrate an optical system suitable for handling light projected through the film from the exterior of the guide 10. In this case two angularly-disposed reflectors 45 are arranged within the guide 10 to reflect light projected through the apertures A at the ends of the series of pictures so that it passes outwardly through the aperture C in the guide 10. The reflectors 45 are spaced apart to pass light projected through the film at the center aperture A. It is to be understood that suitable lens devices 50 may be arranged to handle the light in either of the optical systems set forth. Further, it is to be noted that the film is slightly curved at the picture areas where exposure or projection occurs. Suitable corrective means in the form of lenses, or the like, may be incorporated in the optical system to correct distortion due to the curvature of the film.

Having described only typical preferred forms and applications of the invention, I do not wish to limit myself to the specific details set forth, but wish to reserve to myself any changes or variations that may appear to those skilled in the art or fall within the scope of the following claims:

Having described my invention, I claim:

1. Film handling apparatus including, a film guide having a convex film carrying face, there being a plurality of exposure apertures in said face, and a film actuating sprocket engaging the film at said face.

2. Film handling apparatus including, a film guide having a convex film carrying face, there being a plurality of exposure apertures in said face, and a film actuating sprocket engaging the film at said face, the face being recessed between the apertures.

3. Film handling apparatus including, a film guide having a curved part around which film is adapted to be arranged, said part having picture apertures, an optical system for directing light through the apertures and including light reflecting means within said part of the guide, and a film actuating sprocket engaging the film at the guide.

4. Film handling apparatus including, a film guide having a curved part around which film is adapted to be arranged, said part having picture apertures, an optical system for directing light through the apertures and including light reflecting means within said part of the guide, and a film actuating sprocket engaging the film at the center of the several apertures.

5. Film handling apparatus including a stationary film gate having a film carrying part curved about a central point, the gate having a series of exposure apertures at the said part extending circumferentially of said part, and a film actuating sprocket arranged with its axis close to said point and its periphery tangent to said part of the film gate.

6. Film handling apparatus including, a stationary curved film guide for carrying a film in a curved position, the guide having a plurality of circumferentially spaced apertures, and a rotatable film actuating member eccentric to the guide and engaging the film at the curved portion being carried by the guide, the actuating member having a film engaging face curved in the same direction as the guide and of only slightly shorter radius than the guide.

7. Film handling apparatus including, a stationary film gate having a film carrying part curved about a central point, the gate having a series of exposure apertures at the said part extending circumferentially of said part, and a film actuating sprocket arranged with its axis close to said point and its periphery tangent to said part of the film gate at the middle aperture of the series of apertures.

In witness that I claim the foregoing I have hereunto subscribed my name this 31st day of May, 1928.

WALTER L. WRIGHT.